United States Patent
Goettinger et al.

(10) Patent No.: US 8,744,721 B2
(45) Date of Patent: Jun. 3, 2014

(54) HYDROSTATIC TRACTION DRIVE AND VEHICLE WITH SUCH A TRACTION DRIVE

(71) Applicant: Robert Bosch GmbH, Stuttgart (DE)

(72) Inventors: Norbert Goettinger, Kernen im Remstal (DE); Heinz-Gerhard Essig, Lonsee (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/671,609

(22) Filed: Nov. 8, 2012

(65) Prior Publication Data

US 2013/0124065 A1     May 16, 2013

(30) Foreign Application Priority Data

Nov. 11, 2011 (DE) .......................... 10 2011 118 255

(51) Int. Cl.
*B60K 17/14* (2006.01)
(52) U.S. Cl.
USPC ............................................ 701/99; 180/305
(58) Field of Classification Search
USPC ............................................ 701/99; 180/305
See application file for complete search history.

(56) References Cited

U.S. PATENT DOCUMENTS

| | | | | |
|---|---|---|---|---|
| 4,617,962 A | * | 10/1986 | Brunner | 137/613 |
| 6,305,486 B1 | * | 10/2001 | Polzin et al. | 180/308 |
| 2005/0279560 A1 | * | 12/2005 | Smalley | 180/305 |
| 2009/0064673 A1 | * | 3/2009 | Kauss | 60/420 |

FOREIGN PATENT DOCUMENTS

| | | |
|---|---|---|
| DE | 196 48 706 A1 | 6/1998 |
| DE | 10 2006 058 802 A1 | 6/2008 |
| EP | 1 010 566 A1 | 6/2000 |

* cited by examiner

*Primary Examiner* — Mary Cheung
*Assistant Examiner* — Yuen Wong
(74) *Attorney, Agent, or Firm* — Maginot, Moore & Beck

(57) ABSTRACT

A hydrostatic traction drive includes a pressure medium source configured to drive four hydromotors connected as pairs in series, the pairs arranged parallel to each other. In a respective pressure medium flow path between the hydromotors of a series, a pressure medium volume flow is extracted which is diverted via a respective valve device to a pressure medium sink to bypass the respective downstream hydromotor. The hydrostatic traction drive also includes a control valve configured to balance the pressure on pressure differences between the pressure medium flow paths, in particular on a steering movement of an articulated steering. The control valve is configured to connect the pressure medium flow paths together hydraulically.

10 Claims, 2 Drawing Sheets

HYDROSTATIC TRACTION DRIVE AND VEHICLE WITH SUCH A TRACTION DRIVE

This application claims priority under 35 U.S.C. §119 to patent application no. DE 10 2011 118 255.5, filed on Nov. 11, 2011 in Germany, the disclosure of which is incorporated herein by reference in its entirety.

BACKGROUND

The disclosure relates to a hydrostatic traction drive according to the description below and a vehicle with such a hydrostatic traction drive.

Such hydrostatic traction drives can generally be used in vehicles, in particular however in agricultural utility vehicles such as tractors.

DE 10 2006 058 802 A1 discloses a hydrostatic traction drive in which several hydromotors are supplied with pressure medium via a common variable pump. In the simplest case one hydromotor is allocated to the front axle and one hydromotor to the rear axle, so that on supply of pressure medium to both hydromotors (axle motors), the front and rear axles are driven. In a more complex embodiment example one hydromotor (wheel motor) is allocated to each wheel of the front and rear axles, of which motors again two are connected in series so that on all-wheel drive, the left or right wheels are driven via two hydromotors connected in series.

In the pressure medium flow path between the two hydromotors connected in series, a switch valve is arranged which is pre-tensioned in an open position in which a bypass line is opened, via which the pressure medium flows back from the outlet from the upstream hydromotor, bypassing the downstream hydromotor, to the low-pressure side of the traction drive, so that accordingly only the axle allocated to the upstream hydromotor is driven while the downstream hydromotor is effectively idling as it is being "carried" by the vehicle. To switch this two-wheel drive to four-wheel drive, the switch valve is brought into a blocked position in which the bypass line to the low pressure is blocked so the second hydromotor is also supplied with pressure medium. Switching from two-wheel to four-wheel drive in this solution is voluntary and depends on the experience of the driver.

DE 196 48 706 C2 discloses a hydrostatic traction drive with two hydromotors, each allocated to a wheel of a vehicle axle. In this hydrostatic traction drive a valve device is provided via which the two hydromotors can be connected in series or in parallel. When connected in parallel, the two hydromotors are exposed to practically the same pressure difference so that on cornering, an internal balancing of the through-flow quantities of the two hydromotors results. When connected in series, on cornering cavitations can occur due to the different rotation speeds, in series connection however a synchronous running of the two hydromotors is rather guaranteed.

It is furthermore known from the prior art that the traction drives described above have an articulated steering. With this system two axles of a vehicle are connected via an articulated joint and can pivot relative to each other, for example via hydraulic cylinders. Two wheels are allocated to each axle and can each can be driven by one hydromotor. Hydraulically the traction drive can be configured in particular according to DE 10 2006 058 802 A1. On a steering movement of the articulated steering i.e. on pivoting of the axles relative to each other, two wheels on one side of the vehicle with articulated steering move towards each other while two wheels on the other side move apart. The wheels of the respective side and hence the hydromotors of the respective series are exposed to opposing torques by the steering movement. Due to the opposing torques, the pressure in the pressure medium flow path between the hydromotors arranged in series and allocated to the wheels moving towards each other rises, while the pressure in the pressure medium flow path between the hydromotors of the other series falls. This pressure difference on a steering movement, in particular in the driving state of a vehicle fitted with hydrostatic traction drive, disadvantageously leads to different traction levels of the wheels.

In this context the object of the disclosure is to create a hydrostatic traction drive and a vehicle with such traction drive which eliminates said disadvantages.

This object is achieved by a hydrostatic traction drive with the features described below and by a vehicle with the features described below.

Other advantageous refinements of the disclosure are the subject of further description below.

SUMMARY

According to the disclosure a hydrostatic traction drive has a hydropump, in particular pivotable, to drive four hydromotors. These hydromotors are connected as pairs in series. Advantageously the respective pressure medium flow paths between two hydromotors arranged in series can be connected via a control valve, whereby thus a pressure medium connection between the pressure medium flow paths can be controlled.

This solution offers the advantage that pressure differences between the pressure medium flow paths between each pair of hydromotors arranged in series, in particular due to a steering movement of the wheels driven by the hydromotors, can be compensated for in that the control valve controls a pressure medium connection between the pressure medium flow paths, in particular during the steering movement. Thus pressure differences between the pressure medium flow paths can be easily compensated for. Traction differences because of a steering movement of the wheels driven by the hydromotors are thus avoided.

Preferably a pressure medium volume flow can be diverted from the respective pressure medium flow path between two hydromotors arranged in series via a valve device to a pressure medium sink in order to bypass the downstream hydromotor. The respective valve device is preferably configured such that it limits the pressure medium volume flow to a maximum value which corresponds to a permitted slip at the allocated hydromotor.

The valve device allows the pressure medium flow of the respective pressure medium flow path to the low-pressure side to be limited to a predefined quantity. This quantity then corresponds to a permitted slip at the upstream hydromotor. If this permitted slip is exceeded, a pressure is built up in the pressure medium flow path between the two hydromotors since pressure medium can no longer flow out to the low-pressure side via the valve device. The downstream hydromotor is then supplied with pressure medium when this permitted slip is exceeded so as to support the propulsion via the axle allocated to this hydromotor. As soon as the slip at the upstream hydromotor falls below the limit value, the downstream hydromotor is automatically "switched off" again. Thus switching between two-wheel drive and four-wheel drive is possible without any error-laden voluntary intervention of an operator, whereby the operating safety of the vehicle is substantially improved and the downstream hydromotor is only switched on when needed. Deliberate control of the valve device by a driver is advantageously unnecessary. Because pressure differences between the pressure medium flow paths are compensated for via the control valve, furthermore, in particular on steering movement, the valve devices work at the same pressure.

As the control device is preferably used to balance the pressures on a steering movement, it is controlled as a function of a steering movement of at least two wheels arranged on a common axle, wherein each hydromotor drives one wheel of the traction drive. The control valve is dependent on the steering movement and not on the intervention of the driver. Hence a deliberate action by the driver on the control valve is unnecessary.

Advantageously the hydrostatic traction drive is used with an articulated steering and the control valve is then controlled as a function of a steering movement of the articulated steering. In conventional articulated steering, at least two axles each with two wheels can be pivoted relative to each other via hydraulic steering cylinders. Advantageously the control valve is a directional valve, in particular a proportional directional valve, the valve slide of which can be exposed to a spring force of a valve spring in the direction of its closed position and to the load pressure of a hydraulic steering in the direction of its open position or brought into its open position by an electric, in particular magnetic, actuator. By applying the load pressure to the valve slide, on a steering movement of the hydraulic steering this slide is exposed to load pressure without intervention of the driver. If the valve slide of the control valve is actuated by the electric actuator, this can for example be controlled as a function of a steering movement measured via sensors, also independently of the intervention of the driver.

Preferably the spring force of the valve spring can be adjusted, whereby the load pressure necessary to move the valve slide in the direction of its open position can be set. The control valve can thus be set differently for different vehicle types. For example the spring force is selected such that the valve slide is moved in the direction of its open position from a load pressure of around 50 bar.

On use of a control valve which can be controlled via a load pressure, preferably in a further embodiment of the disclosure a change-over valve is provided which on the input side is connected with two steering cylinders of the articulated steering to extract the highest load pressure. On the output side the change-over valve is then connected to a control line connected with the control valve in order to apply the highest load pressure to the valve slide of the control valve in the direction of its open position.

Preferably an electronic control unit (ECU) is used to evaluate the steering movement detected and to control the control valve, in particular the electric actuator, as a function of the steering movement.

According to the disclosure a vehicle can have a hydrostatic traction drive according to the disclosure, whereby the wheels of the vehicle have substantially no different traction level because of a steering movement, in particular on a steering movement of an articulated steering.

BRIEF DESCRIPTION OF THE DRAWINGS

Preferred embodiment examples of the disclosure are described in more detail below with reference to diagrammatic drawings. These show.

DETAILED DESCRIPTION

Figure 1:
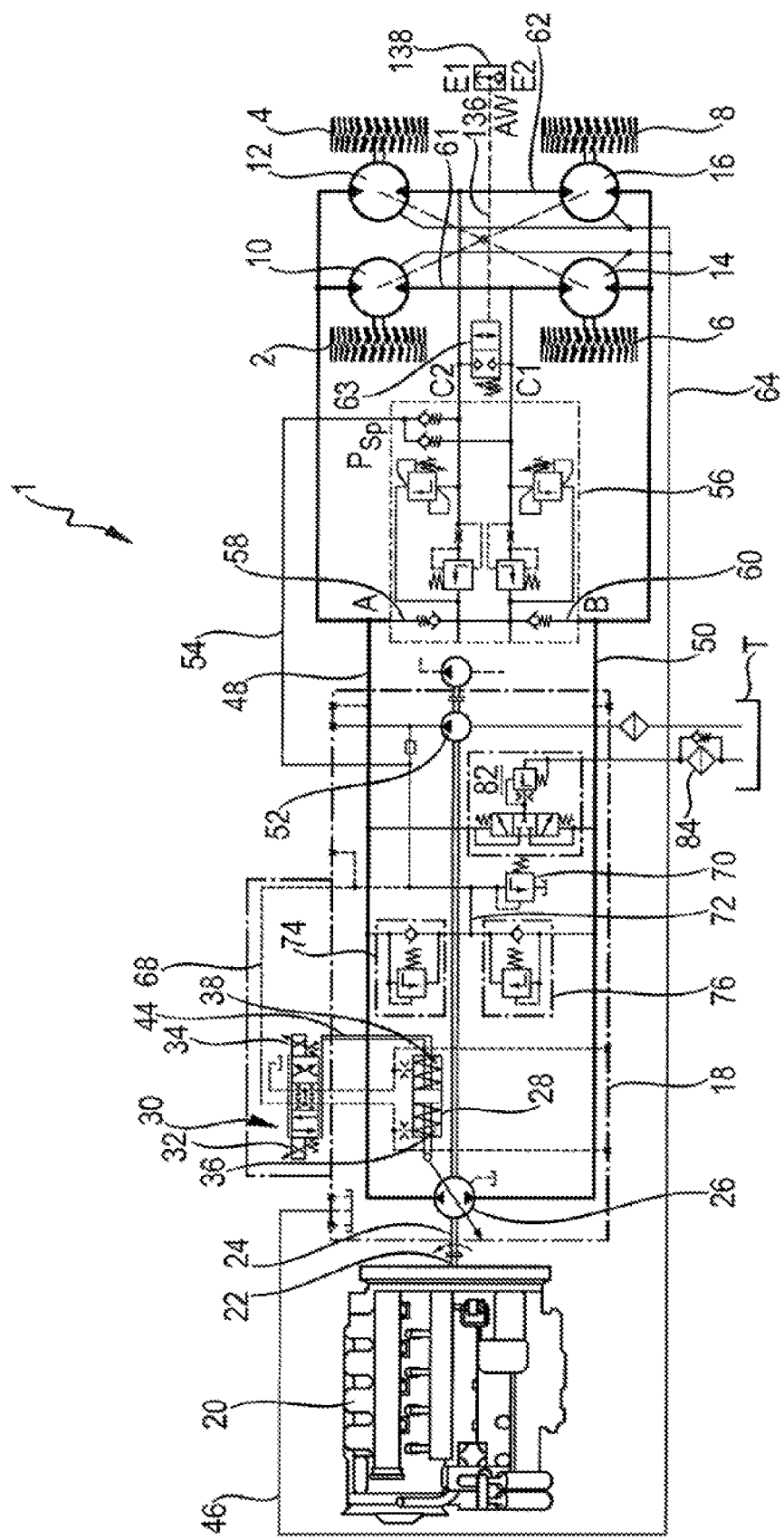
FIG. 1 a circuit diagram of a hydrostatic traction drive according to the disclosure, and FIG. 2 an enlarged view of an extract of the circuit diagram in FIG. 1.

A hydrostatic traction drive 1 according to FIG. 1 is used in an agricultural utility vehicle, for example a tractor. This is configured with all-wheel drive which can be operated in two-wheel drive or four-wheel drive mode depending on the operating conditions. In the embodiment example shown, allocated to each wheel 2, 4 on the front axle and each wheel 6, 8 on the rear axle each is a wheel motor, designated below as hydromotors 10, 12 (e.g. rear axle) and 14, 16 (e.g. front axle). Pairs of hydromotors 10, 14; 12, 16, one from each axle, are connected in series while the hydromotors of one axle 10, 12; 14, 16 are connected in parallel. Pressure medium is supplied to the hydromotors 10, 12, 14, 16 via a variable pump unit 18 which is driven by the tractor engine, in the present case a combustion engine 20. An output shaft from the combustion engine 20 is connected via a coupling 22 with a drive shaft 24 of the variable pump unit 18. The structure of such a variable pump unit 18 is known from the prior art, for example from the book "Oil Hydraulics", G. Bauer, 7th edition; B. G. Teubner, Stuttgart 1998, FIGS. 71, 72, so that here only the construction elements significant for understanding of the disclosure are explained.

Such a variable pump unit 18 has a variable pump 26 which can be swiveled through neutral and for example can be configured as an axial piston pump, the swivel angle of which can be adjusted via an actuating cylinder 28. This setting is made via an electrically adjustable pump control valve 30, configured for example as a servo valve, which can be adjusted via two proportional magnets 32, 24 from a neutral position into a control position in which a control pressure difference can be set in two control chambers 36, 38 of the actuating cylinder 28, via which pressure difference the piston of the actuating cylinder 28 is extended or retracted, wherein this piston movement takes place in each case against the force of one of two return springs 40, 42. The position of the piston of the actuating cylinder 28 is reported back to the pump control valve 30 via a return linkage 44. The actuating movement of the actuating cylinder 28 ends when the moment acting on the return linkage 44 is in equilibrium with the magnetic moment provoked by the control current for the proportional magnets 32, 34; the control valve 30 is then again approximately in its middle position. This guarantees that a deflection of the actuating cylinder 28 and hence a pump delivery flow is allocated to each control current (control of proportional magnets 32, 34). Further details of this electrohydraulic pump control are given in the prior art cited initially.

Leakage occurring in the variable pump unit 18 is returned to a tank T via a leakage line 46.

The variable pump 26 which can swivel across neutral is connected via two lines with the hydromotor arrangement 10, 12, 14, 16, where it is assumed below that the variable pump 26 is set such that the pressure medium is delivered in a feed line 48 lying at the top in FIG. 1 which thus forms the high-pressure line, while the pressure medium from the hydromotors flows back to the suction intake of the variable pump 26 via an outlet line 50 (low-pressure side). When the variable pump 26 swivels across neutral, the pressure medium flow direction is reversed so that the line with reference numeral 50 then becomes the supply line and the line with reference numeral 48 then forms the outlet line.

The traction drive 1 is thus configured as a closed circuit, wherein any leakage losses can be compensated for from the tank T. For this a feed pump 52 is provided which is also driven by the drive shaft 24. Via this feed pump 52, pressure medium is extracted from the tank T and fed via a feed line 54 into the pressure medium flow path between the hydromotors 10, 14; 12, 16 connected in series. For this the feed line 54 is connected to a connection $P_{sp}$ of a valve device 56 which will be explained in more detail below. From the supply line 48 and the outlet line 50, line segments 58, 60 branch off and lead to connections A, B of the valve device 56. A line segment 61 or 62 between the series-connected hydromotors 10, 14 or 12, 16 is connected to a connection C1 or C2 of the valve device 56. The line segments 61 and 62 can be connected together via the control valve 63 according to the disclosure.

Any leakage from the hydromotors 10 to 16 is diverted to tank T via internal leakage lines 64.

As shown in FIG. 1, in addition to the feed pump 52, further feed pumps can be provided to supply pressure medium to further consumers or to compensate for leakages. Via the feed pump 52, in the known manner, control oil can be provided to adjust the actuating cylinder 28. For this a control line 68 branches from the feed line 54 and is guided to the inlet of the pump control valve 30. The pressure in the feed line 54 is limited via a pressure-limiting valve 70. From the feed line 54 furthermore a feed channel 72 branches off and divides towards the lines 48, 50, wherein in each of these branch lines is provided a pressure-limiting unit 74, 76, each of which comprises a non-return valve opening towards the respective line 48 or 50, and a pressure-limiting valve which limits the pressure in the respective line 48, 50 and is arranged in a bypass line bypassing the respective allocated non-return valve. To compensate for leakage therefore pressure medium can be fed into the low-pressure side via the feed pump 52, part of the feed line 54, the branching feed channel 72 and the branch branching to the respective low-pressure side and the non-return valve arranged therein.

The basic construction of such a traction drive is known from the prior art cited initially, for example DE 10 2006 058 802 A1, so that with reference to this application, further explanations are necessary on the pump side part of the traction drive 1.

In FIG. 1 a further flushing valve unit 82 is provided via which pressure medium branches from the respective low-pressure branch and can flow via a filter 84 and where applicable a cooler to the tank T and can thus be regenerated. The extracted pressure medium is compensated for via the feed pump 52 in the manner described above.

The valve device 56 is now explained in more detail with reference to FIG. 2.

Figure 2:
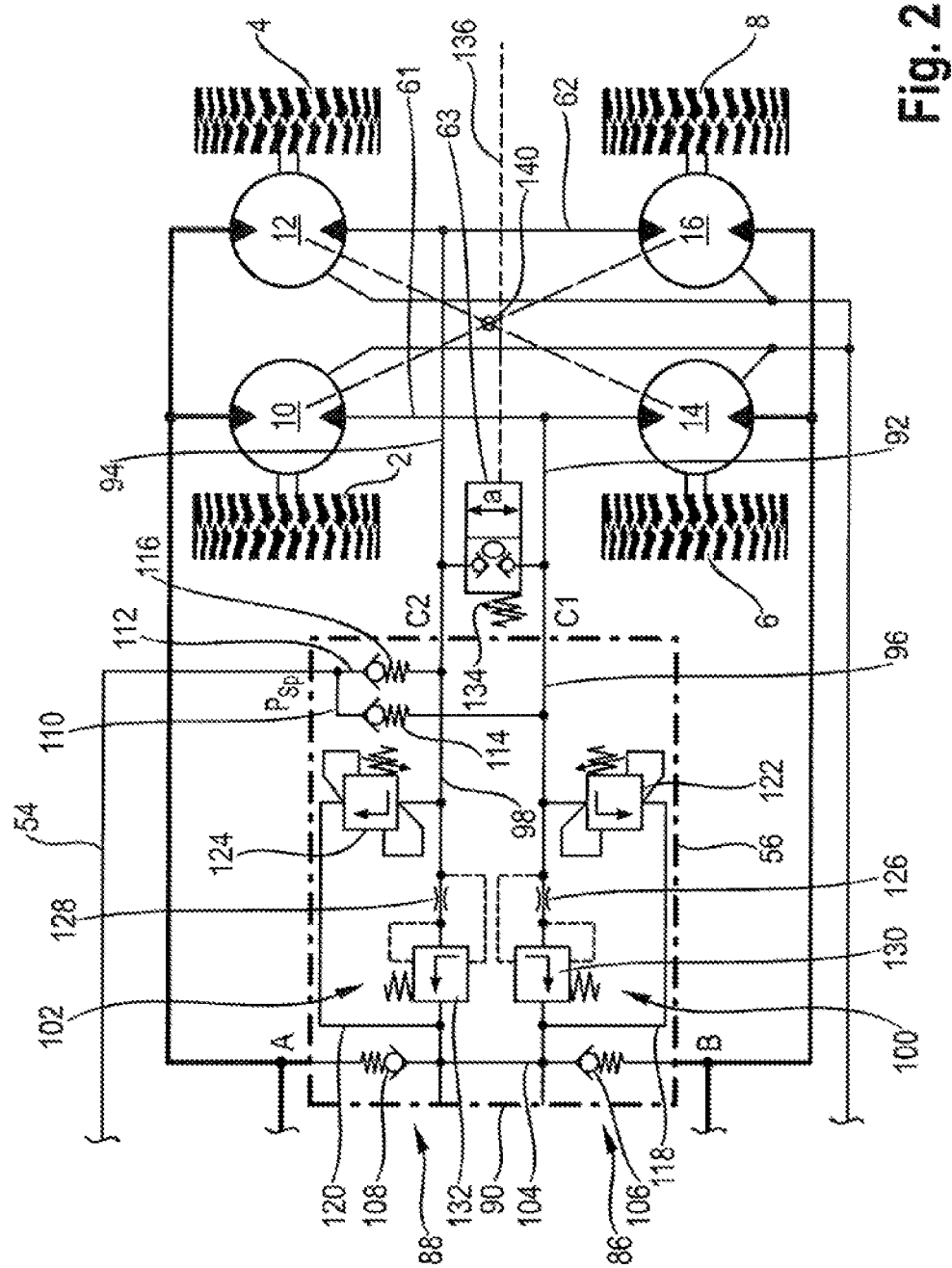

According to FIG. 2, the valve device 56 is formed in two parts with a lower valve unit 86 allocated to the line segment 61 between hydromotors 10 and 14 in FIG. 2, and an upper valve unit 80 allocated to the line segment 62 between the hydromotors 12 and 16. The valve units 86 and 88 are combined in a valve block 90 which is a so-called high efficient traction (HET) block. This has connections C1 and C2 to which a respective line segment 61 and 62 is connected via a branch line 92 and 94. A respective connection C1 or C2 is connected with a bypass line segment 96 or 98 of the valve unit 86 or 88. In this is arranged a quantity-limiting valve 100 or 102. The bypass line segment 96 or 98 opens downstream of its quantity-limiting valve 100 or 102 into a common branch line 104 which is connected with connections A and B of the valve device 56. Downstream of the opening of the bypass line segments 96 or 98 in the branch line 104 is arranged a non-return valve 106 or 108 opening in the flow direction of the pressure medium towards connection B or A, which valve opens at a relatively high pressure, for example 14 bar, and thus releases a pressure medium flow path to the respective low-pressure side connection B or A. The other non-return valve is held closed by the higher pressure in the high-pressure branch.

The feed line 54 divides downstream of connection $P_{sp}$ into two feed line segments 110 and 112. Each feed line segment 110 or 112 is connected via a feed non-return valve 114 or 116 with the bypass line segment 96 or 98 upstream of the quantity-limiting valve 100 or 102. The feed non-return valve 114 or 116 opens in a pressure medium flow direction towards the bypass line segment 96 and 98 at a comparatively low pressure of around 1 bar, so that pressure medium can be fed via the feed pump 52 of FIG. 1, feed line 54 and the feed line segment 110 or 112 and the opening non-return valve 114 or 116 into the bypass line segment 96 or 98 so that the feed pump pressure is also present in the pressure medium flow path 92 or 94 and hence in the region between the two series-connected hydromotors 10, 14 or 12, 16. This guarantees that at least the feed pump pressure can be present at the respective feed of the downstream hydromotors i.e. in the present case hydromotors 14, 16. Downstream of the opening of the feed line 110 or 112 in the bypass line segment 96 or 98 and upstream of the quantity-limiting valve 100 or 102, a bypass line 118 or 120 branches from the respective bypass line segment 96 or 98. In these lines are arranged bypass valves 122 and 124 which each have a valve slide pre-tensioned in a closed position via the spring force of a valve spring. A pressure downstream of the respective quantity-limiting valve 100 or 102 also acts in the same direction. In the opening direction a pressure upstream of the quantity-limiting valve 100 or 102 acts on the valve slide of the respective bypass valve 118 or 120. Consequently a bypass valve 118 or 120 opens when a pressure difference is present over the quantity-limiting valve 100 or 102 which is equal to the pressure equivalent of the valve spring allocated to the bypass valve 122 or 124. In this case then pressure medium can flow via the feed pump 52 from FIG. 1 past the quantity-limiting valve 100 or 102 into the branch line 104.

The quantity-limiting valve 100 or 102 is configured as a flow control valve which limits the maximum volume flow of a respective series of hydromotors 10, 14 or 12, 16 to the low-pressure side. The respective flow control valve 100 or 102 is formed by a measurement diaphragm 126 or 128 and a pressure regulator 130 or 132 arranged downstream thereof, the valve slide of which is exposed to the force of a pressure regulator spring and the pressure downstream of the measurement diaphragm 126 or 128 in the opening direction, and to the pressure upstream of the measurement diaphragm 126 and 128 in the closing direction. Via a respective pressure regulator 130 or 132 therefore the pressure medium volume flow is limited via the measurement diaphragm 126 or 128. This means that depending on the setting of this quantity-limiting valve 100 or 102, pressure medium flows via the pressure medium flow path 92 or 94 from the outlet of the upstream hydromotors 10, 12 to the low pressure, so that no pressure can build up in the supply to the upstream hydromotors 14, 16. Consequently on ground with good traction (no slip), the two upstream hydromotors 10, 12 and the corresponding wheels 2, 4 (see FIG. 1) are driven while the two downstream hydromotors 14, 16 are merely "carried" by the vehicle and hence run at idle. The rotation speed of the hydromotors 10 to 16 is however the same. The maximum permitted pressure medium volume flow through the quantity-limiting valve 100 or 102 is configured such that at a certain slip at the wheels 2, 4 (see FIG. 1) and the corresponding hydromotors 10, 12, due to the resulting increase in rotation speed of hydromotors 10, 12, a pressure is built up in the supply to the two other hydromotors 14, 16 so that these are then switched on and the vehicle drives in all-wheel drive. This means that by corresponding configuration of the quantity-limiting valve 100 or 102, the permitted slip at the respective upstream hydromotor 10, 12 can be determined. When this slip of wheel 2 or 4 is exceeded, the respective downstream hydromotor 14 or 16 is switched on. No intervention of an operator is then required, so that driving safety and operating comfort are substantially improved.

The switching from two-wheel drive to four-wheel drive described above naturally also takes place when the variable pump 26 swivels across neutral and there is a corresponding change in driving direction.

In principle the quantity-limiting valve 100 or 102 can also be configured to be adjustable so that the permitted slip can be set depending on operating conditions or direction of travel.

The control valve 63 in FIG. 2 is arranged between the branch lines 92 and 94 upstream of the valve unit 86 or 88. The control valve 63 is a 2/2-way valve with a closed position 0 and an open position A. A valve slide of control valve 63 is pretensioned via a valve spring 134 in the closed position 0 in which a pressure medium connection is closed between the branch lines 92 and 94. Via a control line 136, the valve slide of the control valve 63 can be pressed in the direction of an open position A by a load pressure of a hydraulic steering not shown, against the spring force of the valve spring 134. In the open position A the branch lines 92 and 94 are in pressure medium connection.

The control line 136 according to FIG. 1 is connected with an output AW of a change-over valve 138. This has two inputs E1 and E2 which are each connected with a steering cylinder (not shown) of an articulated steering of a vehicle having the traction drive. Via the change-over valve 138, the steering cylinder with the highest load pressure is then connected with the control line 136 whereby the highest load pressure is then applied to the valve slide of the control valve 63 of FIG. 2. The control valve 63 is thus exposed to a load pressure on a steering movement i.e. on deployment of the steering cylinder, not shown. The articulated steering comprising steering cylinders is well known from the prior art, for which reason reference is made to this for further information.

A pivot axis 140 of the articulated steering is shown in FIG. 2 which lies approximately at the intersection of two diagonals connecting the hydromotors 10, 16 and 12, 14. Via the articulated steering, the rear axle with wheels 2 and 4 and the front axle with wheels 6 and 8 can be pivoted relative to each other about the pivot axis 140. If via the articulated steering the two axles are pivoted for example to the left, the wheels 2 and 6 of the one side move towards each other while the wheels 4 and 8 of the other side move apart. As the wheels 2 and 6 or 4 and 8 roll on a surface, they experience an opposing torque. These opposing torques of wheels 2 and 6, or 4 and 8, are transmitted to their allocated hydromotors 10 and 14 or 12 and 16, which leads to a pressure rise in the line segment 61 between hydromotors 10 and 14 and to a pressure fall in the line segment 62 between hydromotors 12 and 16. The different pressures in the line segments 61 and 62 would again lead to an unequal drive behavior of the hydromotors 10 to 16, wherein then the allocated wheels 2 to 8 would have different traction levels. With the control valve 63 according to the disclosure, the pressure difference resulting from the steering movement between the line segments 61 and 62 can be compensated for. On a steering movement of the articulated steering (not shown) about the pivot axis 140, a load pressure is applied to the steering cylinders wherein the highest load pressure is extracted by change-over valve 138 of FIG. 1 and applied to the valve slide of the control valve 63 in the direction of its open position. If the pressure force of the load pressure exceeds the spring force of the valve spring 143 of control valve 63, the valve slide is moved into its open position A in which the branch lines 92 and 94, and via these line segments 61 and 62, are connected together and the pressure difference between the line segments 61 and 62 is balanced. After the end of the steering movement, the load pressure falls, whereby the valve slide of the control valve 63 is moved again into its closed position 0 under the spring force of valve spring 134, whereby a pressure medium connection between line segments 61 and 62 is broken again. The control valve 63 is thus switched automatically into the open position A on a steering movement. By adjusting the spring force of the valve spring 134, the necessary load pressure required to move the valve slide of control valve 63 into its open position can be set. The valve spring 134 is thus for example set such that the necessary load pressure is at least around 50 bar. By balancing the pressures of the line segments 61 and 62 during the steering movement, the valve devices 86 and 88 are advantageously supplied with the same pressure which leads to equal conditions of slip control of the two series of hydromotors 10, 14 and 12, 16.

Alternatively it can be provided that the control valve 63 is actuated electrically. For this the valve slide is moved in the direction of its open position via an electromagnetic actuator against the spring force of valve spring 134. The actuator is here controlled by an electronic control unit (ECU) which detects and evaluates a steering deflection of the articulated steering, in particular via sensors, and then deploys the actuator of the control valve 63 accordingly to compensate for the pressure differences occurring from the steering movement between the line segments 61 and 62.

It is conceivable that the control valve 63 is formed as a proportional valve.

The control valve 63 can for example also be arranged in the valve block 90. Furthermore it is conceivable also to arrange the flushing valve unit 82 in the valve block 90.

A hydrostatic drive is disclosed with a pressure medium source to drive four hydromotors connected as pairs in series arranged parallel to each other. In the pressure medium flow path between the hydromotors of a series, a pressure medium volume flow can be extracted which can be diverted via a respective valve device to a pressure medium sink to bypass the respective downstream hydromotor of a series. To balance the pressure on pressure differences between the pressure medium flow paths, in particular on a steering movement of an articulated steering, a control valve is provided via which the pressure medium flow paths can be connected together hydraulically.

What is claimed is:

1. A hydrostatic traction drive comprising:
   a first hydromotor pair including a first hydromotor configured to drive a first wheel and a second hydromotor configured to drive a second wheel, the first and second hydromotors being connected in series by a first pressure medium flow path;
   a second hydromotor pair arranged in parallel with the first hydromotor pair, the second hydromotor pair including a third hydromotor configured to drive a third wheel and a fourth hydromotor configured to drive a fourth wheel, the third and fourth hydromotors being connected in series by a second pressure medium flow path;
   a control valve arranged between the first hydromotor pair and the second hydromotor pair, the control valve being configured to connect the first pressure medium flow path to the second pressure medium flow path;
   a first axle, on which the first and third wheels are supported; and
   a second axle, on which the second and fourth wheels are supported,
   wherein the control valve is a directional valve including a valve slide and a valve spring having a spring force, and the spring force of the valve spring biases the valve slide toward a closed position, and wherein the valve slide is exposed to a load pressure of an articulated steering system to urge the valve slide toward an open position as a function of a steering movement of the articulated steering system.

2. The hydrostatic traction drive according to claim 1, further comprising:
a valve device configured to (i) divert a first pressure medium volume flow extracted from the first pressure medium flow path to a pressure medium sink to bypass the second hydromotor, which is positioned downstream of the first hydromotor, and (ii) divert a second pressure medium volume flow extracted from the second pressure medium flow path to the pressure medium sink to bypass the fourth hydromotor, which is positioned downstream of the third hydromotor.

3. The hydrostatic traction drive according to claim 1, wherein the control valve is a proportional directional valve.

4. The hydrostatic traction drive according to claim 1, wherein the spring force of the valve spring is adjustable.

5. The hydrostatic traction drive according to claim 1, further comprising:
a change-over valve having an input side and an output side,
wherein the input side is configured to be connected to a first steering cylinder and a second steering cylinder of the articulated steering system to extract a highest load pressure of a first load pressure of the first steering cylinder and a second load pressure of the second steering cylinder, and
wherein the output side is configured to be connected to a control line connected with the control valve to apply the highest load pressure to the valve slide to urge the valve slide toward the open position.

6. A vehicle comprising:
a first axle, on which a first wheel and a third wheel is supported;
a second axle, on which a second wheel and a fourth wheel is supported; and
a hydrostatic traction drive comprising:
a first hydromotor pair including a first hydromotor configured to drive the first wheel and a second hydromotor configured to drive the second wheel, the first and second hydromotors being connected in series by a first pressure medium flow path;
a second hydromotor pair arranged in parallel with the first hydromotor pair, the second hydromotor pair including a third hydromotor configured to drive the third wheel and a fourth hydromotor configured to drive the fourth wheel, the third and fourth hydromotors being connected in series by a second pressure medium flow path; and
a control valve arranged between the first hydromotor pair and the second hydromotor pair, the control valve being configured to connect the first pressure medium flow path to the second pressure medium flow path,
wherein the control valve is a directional valve including a valve slide and a valve spring having a spring force, and the spring force of the valve spring biases the valve slide toward a closed position, and
wherein the valve slide is exposed to a load pressure of an articulated steering system to urge the valve slide toward an open position as a function of a steering movement of the articulated steering system.

7. A hydrostatic traction drive comprising:
a first hydromotor pair including a first hydromotor configured to drive a first wheel and a second hydromotor configured to drive a second wheel, the first and second hydromotors being connected in series by a first pressure medium flow path;
a second hydromotor pair arranged in parallel with the first hydromotor pair, the second hydromotor pair including a third hydromotor configured to drive a third wheel and a fourth hydromotor configured to drive a fourth wheel, the third and fourth hydromotors being connected in series by a second pressure medium flow path;
a control valve arranged between the first hydromotor pair and the second hydromotor pair, the control valve being configured to connect the first pressure medium flow path to the second pressure medium flow path;
a first axle, on which the first and third wheels are supported; and
a second axle, on which the second and fourth wheels are supported,
wherein the control valve is a directional valve having a valve slide and a valve spring, and the valve spring biases the control valve toward a closed position, and
wherein the control valve is configured to be actuated by an actuator operated as a function of an articulated steering movement of at least one of the first axle and the second axle to urge the valve slide toward an open position.

8. The hydrostatic traction drive according to claim 7, further comprising:
an electronic control unit configured to detect and evaluate the steering movement and to operate the actuator to as a function of the steering movement.

9. The hydrostatic traction drive according to claim 7, further comprising:
a valve device configured to (i) divert a first pressure medium volume flow extracted from the first pressure medium flow path to a pressure medium sink to bypass the second hydromotor, which is positioned downstream of the first hydromotor, and (ii) divert a second pressure medium volume flow extracted from the second pressure medium flow path to the pressure medium sink to bypass the fourth hydromotor, which is positioned downstream of the third hydromotor.

10. The hydrostatic traction drive according to claim 7, wherein the control valve is a proportional directional valve.

* * * * *